US 9,084,103 B2

(12) United States Patent
Monks et al.

(10) Patent No.: US 9,084,103 B2
(45) Date of Patent: Jul. 14, 2015

(54) ANALYTIC AND TRACKING SYSTEMS AND METHODS USING OVER-THE-AIR IDENTIFIERS OF MOBILE DEVICES

(71) Applicant: MOTOROLA SOLUTIONS, INC, Schaumburg, IL (US)

(72) Inventors: Deborah J Monks, Palatine, IL (US); Tyrone D Bekiares, Park Ridge, IL (US); Timothy J Collins, Homer Glen, IL (US); Trent J Miller, West Chicago, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/158,045

(22) Filed: Jan. 17, 2014

(65) Prior Publication Data

US 2014/0134971 A1    May 15, 2014

Related U.S. Application Data

(63) Continuation of application No. 13/603,920, filed on Sep. 5, 2012, now Pat. No. 8,892,132.

(51) Int. Cl.
*H04M 11/04* (2006.01)
*H04W 4/22* (2009.01)
(Continued)

(52) U.S. Cl.
CPC ............... *H04W 4/22* (2013.01); *G01S 13/878* (2013.01); *G08B 21/02* (2013.01); *H04W 4/00* (2013.01); *G01S 5/02* (2013.01); *G08B 21/0272* (2013.01); *H04W 4/005* (2013.01); *H04W 4/008* (2013.01)

(58) Field of Classification Search
CPC ...... H04W 64/00; H04W 4/02; H04W 76/007; H04W 11/04
USPC .................... 455/456.5, 456.1, 404.1; 379/37
See application file for complete search history.

(56) References Cited

U.S. PATENT DOCUMENTS 7,246,746 B2    7/2007    McNamara et al.
7,400,892 B1    7/2008    Banks et al.
(Continued)

FOREIGN PATENT DOCUMENTS

CA    2500082 A1    9/2006
EP    1895462 A1    3/2008
(Continued)

OTHER PUBLICATIONS

Ericsson Labs, "Mobile Location API" Maps and Positioning Version 1.5; Updated May 5, 2011; 5 Pages.
(Continued)

*Primary Examiner* — Danh Le
(74) *Attorney, Agent, or Firm* — Kenneth A. Haas; Daniel R. Bestor

(57) ABSTRACT

Analytic and tracking systems and methods are described that use over-the-air identifiers (OTAIs) of mobile devices for tracking, dispatch, identification, etc. In particular, the analytic and tracking systems and methods can include various OTAI sensors that are communicatively coupled to a server and with one another. The OTAI sensors are configured to identify proximate mobile devices concurrent with at least one additional piece of information. The analytic and tracking systems and methods can process identified mobile devices and the additional pieces of information for a plurality of applications.

7 Claims, 9 Drawing Sheets

(51) Int. Cl.
*G01S 13/87* (2006.01)
*G08B 21/02* (2006.01)
*H04W 4/00* (2009.01)
*G01S 5/02* (2010.01)

(56) References Cited

U.S. PATENT DOCUMENTS

| | | | |
|---|---|---|---|
| 7,433,694 | B2 | 10/2008 | Morgan et al. |
| 7,692,579 | B2 | 4/2010 | Vassilovski |
| 7,834,765 | B2 | 11/2010 | Sawyer |
| 8,027,549 | B2 | 9/2011 | Podilchuk |
| 8,036,426 | B2 | 10/2011 | Hampapur et al. |
| 8,049,658 | B1 | 11/2011 | Lagonik et al. |
| 8,217,785 | B2 | 7/2012 | Steer |
| 8,260,323 | B1 | 9/2012 | Bronner et al. |
| 2002/0057764 | A1* | 5/2002 | Salvucci et al. ........ 379/37 |
| 2007/0008981 | A1 | 1/2007 | Pathan |
| 2007/0239813 | A1 | 10/2007 | Pinder et al. |
| 2007/0287428 | A1 | 12/2007 | Diacakis et al. |
| 2008/0036612 | A1 | 2/2008 | Koslow et al. |
| 2008/0081638 | A1 | 4/2008 | Boland et al. |
| 2008/0164997 | A1* | 7/2008 | Aritsuka et al. ........ 340/539.13 |
| 2008/0231460 | A1 | 9/2008 | Owen et al. |
| 2008/0287143 | A1* | 11/2008 | Banks et al. ........ 455/456.5 |
| 2008/0318591 | A1 | 12/2008 | Oliver |
| 2010/0227628 | A1* | 9/2010 | Anderson et al. ........ 455/456.3 |
| 2011/0035420 | A1 | 2/2011 | Alizadeh-Shabdiz et al. |
| 2011/0143776 | A1 | 6/2011 | Shankaranarayanan et al. |
| 2011/0151839 | A1 | 6/2011 | Bolon et al. |
| 2012/0105232 | A1 | 5/2012 | Humbard |
| 2012/0195295 | A1 | 8/2012 | Elmaleh |
| 2012/0244885 | A1 | 9/2012 | Hefetz |
| 2013/0023247 | A1 | 1/2013 | Bolon et al. |
| 2013/0031601 | A1* | 1/2013 | Bott ........ 726/1 |
| 2013/0150074 | A1 | 6/2013 | Shrestha et al. |
| 2014/0066028 | A1 | 3/2014 | Millet et al. |
| 2014/0066089 | A1 | 3/2014 | Monks et al. |

FOREIGN PATENT DOCUMENTS

| | | |
|---|---|---|
| EP | 2189957 A1 | 5/2010 |
| WO | 2010145172 A1 | 12/2010 |

OTHER PUBLICATIONS

International Communication for Counterpart Application (PCT/US2013/055750) of Parent U.S. Appl. No. 13/603,920 Dated Dec. 18, 2013.

Quick, Darren, "Researchers Track Mobile Phone Locations With Cheap Hardware and Open-Source Software", Feb. 16, 2012, XP002717767.

Notice of Allowance Dated Jan. 6, 2014 for Parent U.S. Appl. No. 13/603,920.

Gen Tian, et al. "A New Mobile Police Spatial Information Service Grid Computing Model Based on Mobile Agent", Geoinformatics, 2010 18th International Conference on, Piscataway, NJ, Jun. 18, 2010; pp. 1-5, XP031750257; ISBN: 978-1-4244-7301-4; Abstract, Section 1, 2.

Jaishankar K., et al. "Crime Analysis Mapping in India: A GIS Implementation in Chennai City", ALGO Research Quarterly, Dec. 1, 2001; pp. 4-25; XP002996111, Abstract.

International Search Report for Counterpart Application (PCT/US2013/055742) of Related U.S. Appl. No. 13/603,589 Dated Nov. 21, 2013.

Non Final Office Action mailed Nov. 6, 2013 in U.S. Appl. No. 13/603,920, Deborah J. Monks, filed Sep. 5, 2012.

Non Final Office Action mailed Jan. 22, 2014 in U.S. Appl. No. 13/603,589, Deborah J. Monks, filed Sep. 5, 2012.

Notice of Allowance mailed Mar. 3, 2014 in U.S. Appl. No. 13/603,589, Trent J Miller, filed Sep. 5, 2012.

Notice of Allowance mailed Apr. 2, 2014 in U.S. Appl. No. 13/603,589, Trent J Miller, filed Sep. 5, 2012.

* cited by examiner

ANALYTIC AND TRACKING SYSTEMS AND METHODS USING OVER-THE-AIR IDENTIFIERS OF MOBILE DEVICES

RELATED APPLICATIONS

The present disclosure is related to co-pending U.S. patent application Ser. No. 13/603,920, filed on Sep. 5, 2012, priority to which is claimed.

FIELD OF THE DISCLOSURE

The present disclosure relates generally to wireless networking via mobile devices and more particularly to analytic and tracking systems and methods using over-the-air identifiers of mobile devices.

BACKGROUND

Conventionally, there is no way of knowing who is/was in the vicinity of a scene of a crime, accident, or the like to identify potential witnesses and suspects. There is also no effective means for detecting and communicating threat information on a real time basis, such as detecting a person who is wanted for a violent crime or a gang members in the vicinity of an officer, or detecting individuals/devices that have an abnormal pattern of appearance at terrorist targets, at certain types of incidents such as fire scenes, or specific classes of individuals at specific classes of locations (e.g., a sex offender loitering near a playground). Video is a potential option, but is limited due to image quality in both day time and night time. Video also requires an image to be in the field of view which does not work well for individuals which hide from camera vision. Further, video is expensive to deploy and with the current state of facial analytics, requires human resources to detect threats. Another option is the use of a cell phone Mobile Identification Number (MIN), but the issue here is the number of users on a cell site which is designed for 3 mile radius can be quite large which in turn causes delays in tracking down the proper suspect or individuals present at an incident. Additionally, in many instances, a warrant must be issued for tracking citizen location, and a subpoena is required to identify owners of a MIN. This prevents real time detection and tracking.

There is also a need for a system which allows users in a small geographic area to be tracked. This need is driven by the desire to identify which officers have arrived on the scene of an incident, as many times officers come to the scene of an incident without being dispatched. The need to track individuals in a small geographic area is also driven by the desire to identify citizens at the location of an incident for purposes of identifying and tracking suspects, as well as identifying potential witnesses and threats. While Global Positioning Satellite (GPS) could be used, not every officer carries a portable device with GPS, and officers may arrive on scene from other jurisdictions that do not share location tracking between agencies. MIN solutions are unable to address small geographic area tracking and cannot be coupled with local intelligence such as officer inputs, captured images, etc. on a real time basis.

In public safety environments (e.g., police), there is also a need to track patterns of individuals without knowing their identity. For example determining that ID #1234 is present in five different areas where crimes have occurred or has been traveling with ID #5678 which has been at the scene of a recent crime could allow public safety officers to look for movement patterns between ID numbers and to track and locate suspects for apprehension or questioning.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
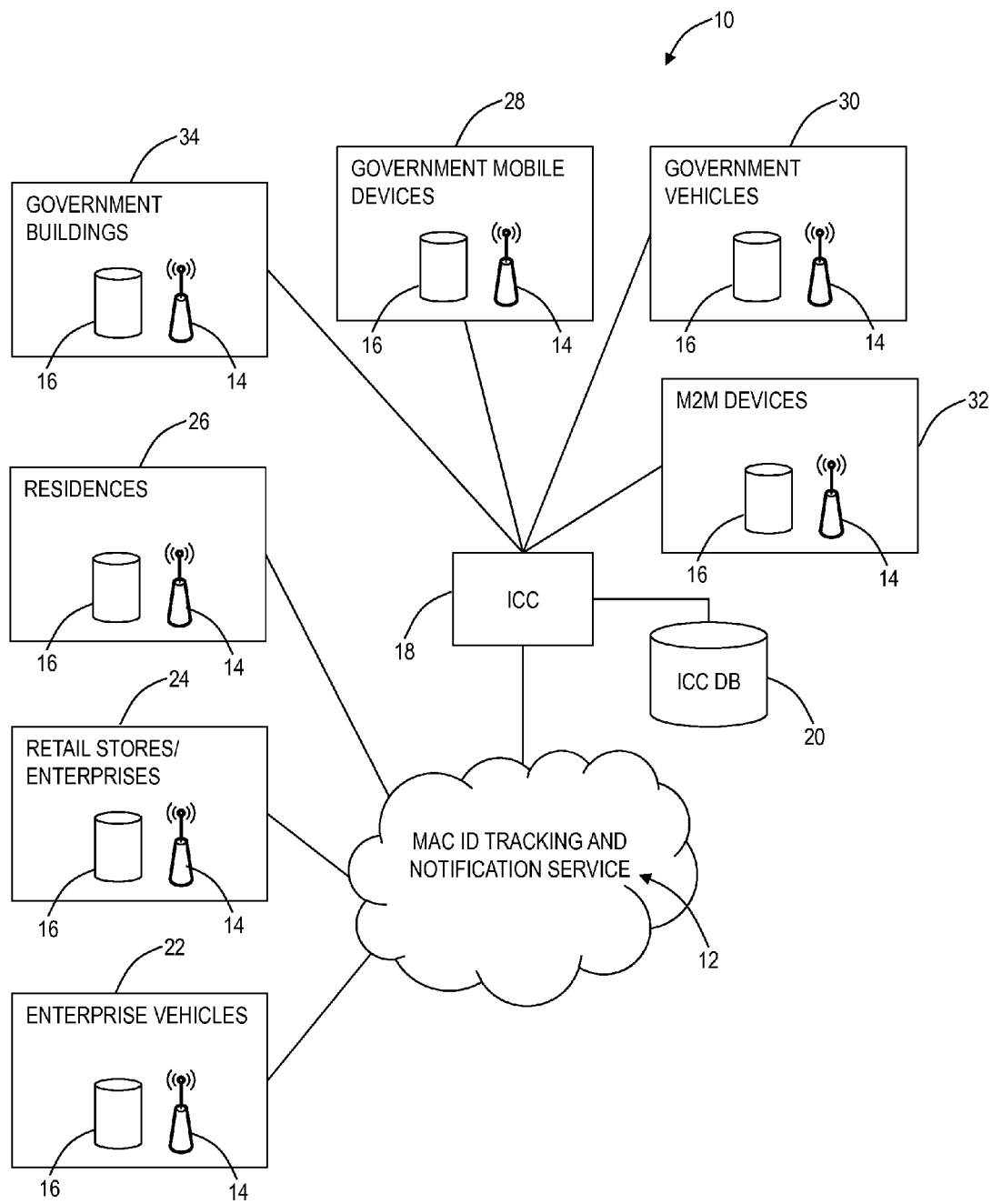
FIG. 1 is a network diagram of an analytic and tracking system with a MAC ID tracking and notification service in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, analytic and tracking systems and methods are described that use over-the-air identifiers (OTAIs) of mobile devices for tracking, dispatch, identification, etc. In particular, the analytic and tracking systems and methods can include various OTAI sensors that are communicatively coupled to a server. The OTAI sensors are configured to identify proximate mobile devices concurrent with at least one additional piece of information. The analytic and tracking systems and methods can process identified mobile devices and the additional pieces of information for a plurality of applications. Exemplary OTAIs include, without limitation, Media Access Control (MAC) addresses, Long Term Evolution (LTE) International Mobile Subscriber Identity (IMSI), LTE IMSI (International Mobile Subscriber Identity), LTE Temporary Mobile Subscriber Identity (TMSI), Globally Unique Temporary ID (GUTID), International Mobile Equipment Identity (IMEI), Land Mobile Radio (LMR) ID, and the like.

In an exemplary embodiment, a tracking method includes operating a plurality of sensors across a geographic region; capturing, by one or more sensors of the plurality of sensors, over-the-air identifiers of proximate mobile devices to the one or more sensors; correlating the captured over-the-air identifiers to detect a trigger indicative of a situation of interest; and, in response to the detecting the trigger, maintaining a watch list of the captured over-the-air identifiers based on the trigger.

In another exemplary embodiment, an identifying and tracking method includes operating a plurality of sensors across a geographic region; capturing an over-the-air identifier of a device at one of the plurality of sensors; capturing at least one additional piece of information associated with the device; correlating the captured over-the-air identifier and associated additional pieces of information to detect triggers indicative of situations of interest; and, in response to detecting a situation of interest, performing an action related to over-the-air identifiers of interest related to the situation of interest.

In yet another exemplary embodiment, an analytic and tracking system includes a plurality of sensors deployed across a geographic region; at least one server, wherein the at least one server and the plurality of sensors are communicatively coupled therebetween; and a database coupled to the at least one server; wherein the plurality of sensors are configured to capture over-the-air identifiers of proximate devices and associated information; and wherein the at least one server and the plurality of sensors are configured to correlate the captured over-the-air identifiers and the associated information for detecting a trigger indicative of a situation of interest and performing an action based thereon.

Referring to FIG. 1, in an exemplary embodiment, a diagram illustrates an analytic and tracking system 10 with an OTAI tracking and notification service 12. The analytic and tracking system 10 and the service 12 generally are configured to track devices via their OTAIs based on a plurality of factors and to provide analytics based thereon. The system 10 can include a plurality of sensors 14 and databases 16 associated therewith that are deployed across various geographic regions, locations, vehicles, etc. The sensors 14 and the databases 16 can be communicatively coupled to an information coordination center (ICC) 18 and an associated database 20. The sensors 14 and the databases 16 can be deployed in various locations such as, for example, enterprise vehicles 22, retail stores/enterprises 24, residences 26, government mobile devices 28, government vehicles 30, machine-to-machine (M2M) devices 32, government buildings 34, and the like. Those of ordinary skill in the art will appreciate the system 10 contemplates deployment of the sensors 14 and the databases 16 anywhere and in either a fixed or mobile configuration.

Figure 2:
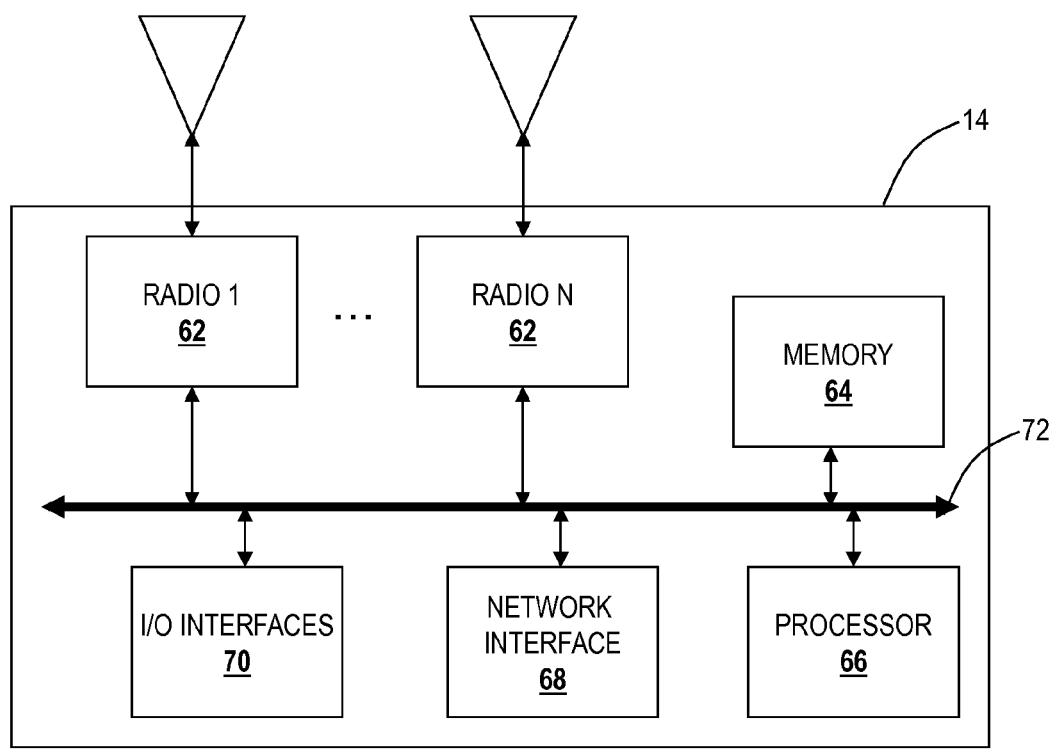
FIG. 2 is block diagram of an exemplary sensor for use with the analytic and tracking system of FIG. 1 in accordance with some embodiments.

In an exemplary embodiment, the OTAIs are MAC addresses. The sensors 14 are configured variously to detect MAC addresses of interest in proximity. The system 10 contemplates various methods of detecting OTAIs. In an exemplary embodiment, the sensors 14 can use Over-The-Air Initialization techniques to determine proximate MAC addresses. For example, many mobile devices use aggressive IEEE 802.11 probing to quickly find wireless local area networks (WLAN). Note WLAN is also referred to as Wi-Fi. A probe request message includes the 48-bit unique MAC address from the sender in a non-encrypted fashion. In this exemplary embodiment, the sensors 14 can be wireless access points (APs) or include similar functionality. Specifically, the sensors 14 can use IEEE 802.11 techniques to collect MAC addresses of proximate mobile devices along with other information as described herein. Advantageously, WLANs have proliferated as have the associated use by mobile devices (e.g., smart phones, tablets, etc.) as a mechanism for low-cost, high-bandwidth to off load cellular networks. As such, WLAN techniques offer a unique ability to quickly and efficiently collect MAC addresses of interest. Other techniques are also contemplated for the sensors 14 such as cellular IDs, Bluetooth IDs, Radio Frequency IDs (RFID), video, license plate cameras, audio analytics, etc. These other techniques may be used in addition to WLAN techniques. An exemplary implementation of the sensor 14 and/or the database 16 is illustrated in FIG. 2.

MAC addresses are unique identifiers assigned to network interfaces on various devices, such as mobile devices. MAC addresses are used for numerous network technologies including most IEEE 802.XXX related technologies such as Ethernet, WLAN, etc. MAC addresses are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. It may also be known as an Ethernet hardware address (EHA), hardware address or physical address. A network node may have multiple NICs and will then have one unique MAC address per NIC. MAC addresses are formed according to the rules of one of three numbering name spaces managed by the IEEE: MAC-48, EUI-48, and EUI-64 (Extended Unique Identifier).

For the analytic and tracking systems and methods, MAC addresses have various advantages as well as other LTE-based OTAIs. First, MAC addresses, by definition, are unique identifiers. Second, MAC addresses are easily obtained with the proliferation of WLAN devices and the like. Specifically, smart phone adoption is ever expanding and these devices are easily tracked via probe requests and the like. Importantly, MAC addresses do not have the same privacy concerns as cell phone MINs or require warrants. That is, MAC addresses can be easily obtained and tracked without privacy or legal concerns. Other OTAI identifiers are also contemplated herein. For example, LTE offers various OTAIs, and an emerging LTE standard called LTE ProSe allows for one wireless device to determine it is in proximity of a second wireless device and relay that information to a server. LTE ProSe is in 3GPP Rel-12

The analytic and tracking systems and methods leverage the fact that each electronically enabled mobile device offers the ability to allow the device to connect to a WLAN access point or other wireless networks and devices on demand or automatically. The analytic and tracking systems and methods further leverage the fact that mobile devices automatically look to associate with networks or devices without user intervention. This could be based on electronic ID scanning devices that look for individual ID's, that capture all ID's that are present, or that act as WLAN access points, etc.

Each of the sensors 14 includes an associated database 16 that is where collected OTAIs are stored along with other pertinent information. Specifically, the sensors are configured to associate collected OTAIs with at least one additional piece of information to determine if a collected OTAI is of interest for tracking or dispatch purposes. Thus, in an exemplary embodiment, it is expected that each sensor 14 can perform some level of local processing of collected data prior to sharing information through the service 12. Further, the sensors 14 can share collected and processed data with one another for flagging OTAIs of interest, correlating activities, etc. Further, the collected and processed data is shared with the ICC 18 and the ICC DB 20 for correlation, analytics, and the like.

There can be any number of techniques to determine OTAIs of interest. As described herein, an OTAI of interest is one identified by the system 10 and/or the service 12 to have some characteristic, i.e. at least one piece of information, worthy of tracking and the like. In the public safety context, this can be a device of interest for some underlying reason as is described herein. The following provide exemplary, non-limiting methods of determining OTAIs of interest. First, an OTAI of interest may be based on being sensed on the sensor 14 at two or more places of interest. For example, this could include being detected stationary at two bridges that may be terrorist targets. Second, an OTAI of interest may be based on being sensed by the sensor 14 at a single location with an abnormal presence pattern. For example, being near a nuclear power plan for long periods over several days.

Third, an OTAI of interest may be based on being sensed by the sensor 14 at a single location that the OTAI is prohibited from being near. For example, a person with a restraining order detected at prohibited location, a sex predator near a school, detection of any OTAI in a restricted area, such as a nuclear power plant or beyond a restricted area at a monument, etc. Fourth, an OTAI of interest may be based on being sensed by the sensor 14 at a single location where other analytics have detected a potential current or future crime (e.g., gunshot, suspicious packages, etc.). In this example, the other analytics can come from the other networks and systems to obtain data related to proximate OTAIs in location and time of events. Fifth, an OTAI of interest may be based on being associated with one or more computer-assisted dispatch (CAD) incidents (e.g. within a radius of an incident before and after a crime has occurred). For example, the system 10 can be communicatively coupled to other networks and systems such as public safety networks, CAD, etc. That is, based on a CAD incident report, the OTAI of interest could be at a public safety incident or crime scene.

Sixth, an OTAI of interest may be based on being associated with a threat class (e.g., associated with gang activity, by being observed/associated with known gang members, etc.). A threat class is a predetermination of some level of threat associated with an OTAI. Seventh, a MAC address of interest may be based on being associated with another ID of interest, e.g., an RFID tag of a stolen item, the license plate of a stolen vehicle, or the voice pattern of a person of interest. Each of the foregoing can be referred to as a trigger which is indicative of a situation where it would be advantageous to capture MAC addresses. Those of ordinary skill in the art will recognize that the foregoing is a non-exhaustive list, and the analytic and tracking systems and methods contemplate additional criteria for identifying OTAIs of interest. The key is to identify such addresses precisely and timely enough to generate police actions to prevent or more quickly resolve or prevent incidents.

In an exemplary embodiment with the sensors 14 being implemented using Wi-Fi APs or equivalent for OTAIs being MAC addresses, as part of the communications protocol between a mobile device and the sensor 14, the mobile device will transmit its unique MAC address to obtain an Internet Protocol (IP) address when requested by the access point. In the system 10, this allows all government owned entities (buildings 34, government vehicles 30, government M2M devices 32 such as lamp posts, video cameras, and traffic lights, and government worker devices 28) equipped with the sensors 14 to track, store, and correlate MAC addresses over time at particular locations. Of note, the sensor 14 does not have to grant the request for an IP address. The sensor 14 just has to learn the requesting devices MAC ID. Government entities could also offer a free Wi-Fi service and MAC ID tracking could be an added feature.

In another exemplary embodiment, various government entities, e.g. devices 28, 32, vehicles 30, government buildings 34, etc., can be equipped with the sensors 14 that are configured to look for OTAIs as well as one or more of the following information: Bluetooth, Cell MAC ID's, 802.XX ID's, or RFID. With respect to the vehicles 30, the addition of the sensors 14 to government owned vehicles (e.g., bus, street sweepers, sanitation, police, fire, etc.) allows OTAIs to be acquired with even more granularly throughout a city and at major incidents. With respect to the buildings 34, adding the sensors 14 to government owned buildings and vehicles allows OTAIs' to be gathered and correlated with known gang activities or other criminal activities allowing officers to learn OTAIs which are associated with the gang.

With respect to the vehicles 30, the sensor 14 could be a low-power OTAI sensor, such as in the back seat of police cruisers. This could enable OTAIs to be added to police reports and to an OTAI watch list when a person of interest is questioned. Then, this information can be used at a future time to determine the person's location or to notify an officer who may stop the same person 20 minutes later that the person was previously questioned by another officer for suspicious activity. That is, the system 10 and the service 12 can develop both MAC addresses of interest as well as correlating the OTAIs to individuals.

Further, the addition of OTAI sensors outside of police cruisers could be used to detect individuals present at the scene coincident with the officer's arrival, track OTAIs if police car is broken into, etc. The detection of OTAIs near the police cruiser when the officer is away from his/her vehicle can also be used to trigger 360 degree image capture around vehicle, with zoom in/higher resolution picture capture of people. In the system 10, by having multiple sensors 14, a person's route and speed may also be determined by knowing the sequence and timing of ID detection between geographically diverse sensors 14.

With respect to M2M devices 32, integrating the sensors 14 into city owned cameras (fixed cameras, cameras on vehicle, or cameras worn by government employees) could also allow correlation between an image of an individual and their OTAIs. This would enable the OTAI watch list to include pictures as well as the ability to look up a citizen's identity based on their image.

The system 10 can also extend to OTAI detection in vehicles 22, enterprises/retail stores 24, residences 26, etc. For example, these could include the sensors 14 as well communicatively coupled to the ICC 18. These could be used to communicate threats or intelligence to public safety, e.g. flash mobs, or be a new form of neighborhood watch to detect wanted persons or missing children.

The various deployed sensors 14 can be communicatively coupled to the ICC 18 and the ICC DB 20. The ICC 18 can be a server or cluster of servers that is used to perform data archiving, analytics, correlations, etc. Specifically, once a OTAI has been learned, the location of the request and the OTAI can be stored and tracked, such as with the ICC 18 and the ICC DB 20. An OTAI watch list can be created for ID's that have exhibited a pattern to indicate they are a threat through various analytics and data mining at the ICC 18 and the ICC DB 20. At this point, the system 10 does not need to know the name of the user who owns the device, all that is known is the OTAI that has been transmitted. Even in countries that require a warrant to track individuals, this method may be acceptable without a warrant because the individual is unknown. In some countries, a warrant may be required to request or conduct an on-line search on the name of the individual who owns the client device to which the OTAI has been matched, if the OTAI user association is known by a third party such as a cellular carrier. In these cases, the OTAI tracking pattern can be used to demonstrate cause for a warrant.

The system 10 and the service 12 can be used to track the identification numbers of citizens as well as officers and government workers. Tracking officers as well as any government owned device capable of transmitting its OTAI can be used to determine which first or second responders have arrived at the scene of an incident in mutual aid situations and when responders do not have GPS capable devices or are indoors and unable to report location.

With respect to the mobile devices 28, an officer's mobile client device can act as a mobile sensor 14 allowing the officer's client device to obtain OTAIs while walking a beat or at an incident. A database of OTAIs of interest could be accessed automatically and the officer notified if an OTAI of interest is nearby, e.g. the mobile device 28 can communicate to the ICC 18 and the ICC DB 20 via a network. OTAIs of interest could be ones that have been associated with gang members, citizens with warrants, etc. Officer notification could include a picture of a person associated with an OTAI, even if their identity is unknown. If an OTAI that is a known threat on the watch list is detected by an officer, city infrastructure, city vehicles, citizen's devices, or enterprise devices, notifications can be made in real time to 911/dispatch and/or to the nearest officer.

Referring to FIG. 2, in an exemplary embodiment, a block diagram illustrates an exemplary implementation of a sensor 14 for the system 10. Generally, the sensor 14 is configured to, responsive to a trigger, capture an over-the-air identifier of proximate mobile devices. The sensor 14 can further perform correlation, analytics, and the like and communicate to other sensors 14, to databases 16, to the ICC 18, etc. In an exemplary embodiment, the OTAI is a MAC ID, and the sensor 14 can include a wireless AP, a wireless switch/controller, thin AP, and the like. In an exemplary embodiment, the wireless device 60 can include, without limitation: one or more radios 62, memory 64, a processor 66, a network interface 68, and input/output (IO) interfaces 70. The elements of sensor 14 can be interconnected together using a bus 72 or another suitable interconnection arrangement that facilitates communication between the various elements of sensor 14. It should be appreciated that FIG. 2 depicts the sensor 14 in an oversimplified manner and a practical embodiment can include additional components and suitably configured processing logic to support known or conventional operating features that are not described in detail herein.

The radios 62 enable wireless communication to a plurality of wireless devices, such as mobile devices. The sensor 14 can include more than one radio 62, e.g., each wireless radio 62 can operate on a different channel (e.g., as defined in IEEE 802.11), or each wireless radio 62 can operate a different protocol such as IEEE 802.11, RFID, Bluetooth, cellular, etc. In an exemplary embodiment, the sensor 14 contains intelligence and processing logic that facilitates centralized control and management for capturing OTAIs. The memory 64 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 64 can incorporate electronic, magnetic, optical, and/or other types of storage media. Note that the memory 64 can have a distributed architecture, where various components are situated remotely from one another, but can be accessed by the processor 66. In an exemplary embodiment, the databases 16 can be stored in the memory 64.

The processor 66 with the memory 64 generally represents the hardware, software, firmware, processing logic, and/or other components of the sensor 14 that enable communication between the sensor 14 and network components to which sensor 14 is coupled. The processor 66 can be any microprocessor, application specific integrated circuit (ASIC), field programmable gate array (FPGA), digital signal processor (DSP), any suitable programmable logic device, discrete gate or transistor logic, discrete hardware components, or combinations thereof that has the computing power capable of managing the radios 62 and the auxiliary components of the sensor 14. The sensor 14 can also include the network interface 68 that can provide an Ethernet interface (i.e., wired) or another radio (i.e., cellular) such that sensor 14 can communicate with an external network.

In an exemplary embodiment, the sensor 14 can support one or more wireless data communication protocols that are also supported by the wireless network infrastructure. Any number of suitable wireless data communication protocols, techniques, or methodologies can be supported by sensor 14, including, without limitation: RF; IrDA (infrared); Bluetooth; ZigBee (and other variants of the IEEE 802.15 protocol); IEEE 802.11 (any variation); IEEE 802.16 (WiMAX or any other variation); 3GPP LTE; Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. In an exemplary embodiment, the sensor 14 60 is preferably compliant with at least the IEEE 802.11 specification and configured to receive association requests for determining proximate devices and their associated MAC addresses.

Further, the sensor 14 can include I/O interfaces 70 such as, without limitation, a touch screen, a display screen, buttons, touch pad, etc. The I/O interfaces 70 can also include a video device to capture images and video for correlating and capturing with OTAIs of interest. For example, a picture, a series of pictures, or video could be taken and stored with any captured OTAI addresses of interest. This could be used for determining an identity of a person with the MAC addresses of interest. Also, audio can be captured as well.

In the system 10 and the service 12, the sensors 14 can be stand-alone devices or devices integrated into other devices. Examples of stand-alone devices can include low-power OTAI sensors in police cruisers; dedicated OTAI sensors deployed on poles, in buildings, etc.; wearable devices; and the like. Examples of devices integrated into other devices can include APs; mobile devices with integrated sensors; other computing devices with integrated sensors; video cameras with integrated sensors; and the like. The sensors 14 can be communicatively coupled to one another directly, via peering, or indirectly via a server such as the ICC 18. This can be via the radios 62, the network interface 68, and/or the I/O interfaces 70.

Figure 3:
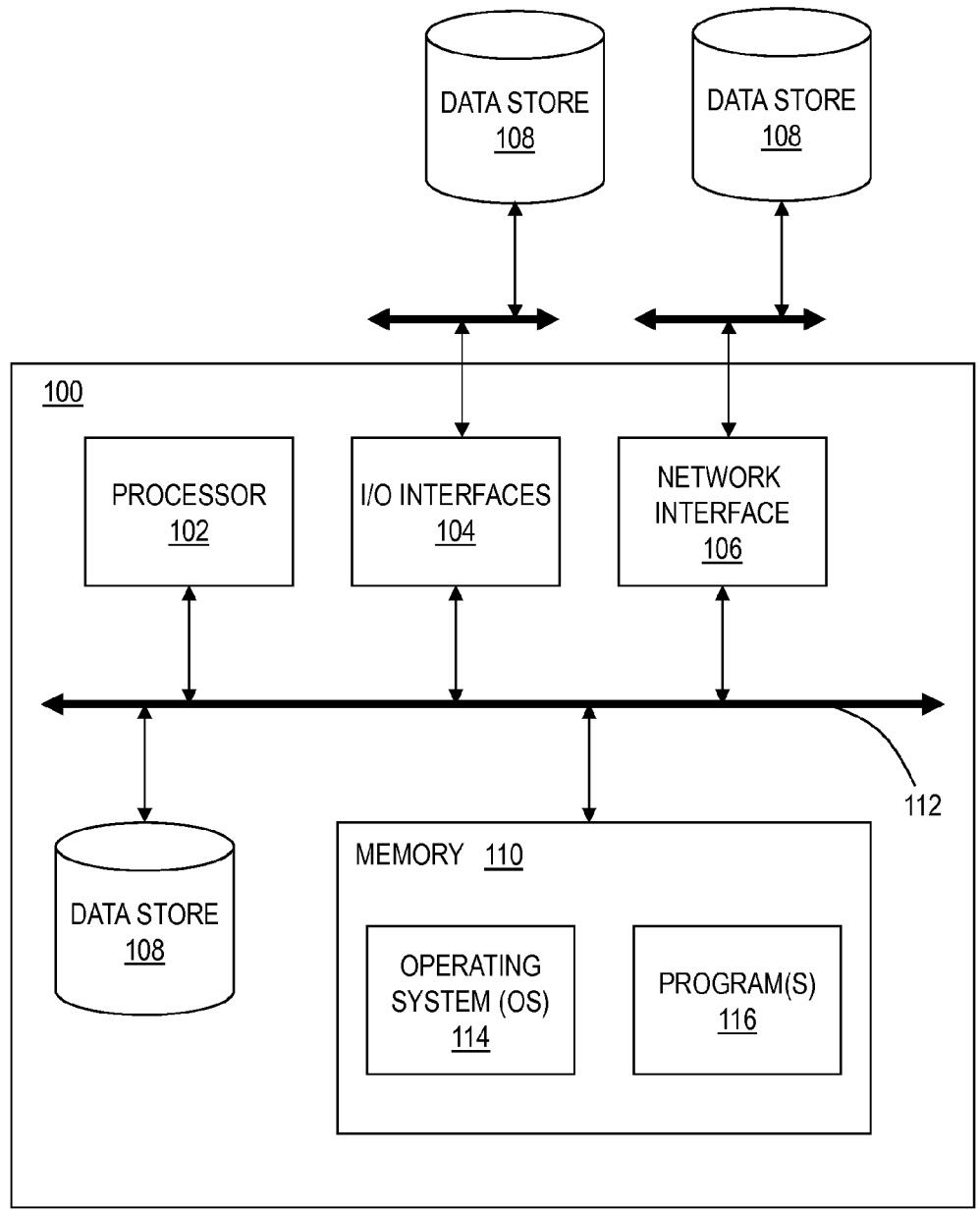
FIG. 3 is a block diagram of an exemplary server for use with the analytic and tracking system of FIG. 1 in accordance with some embodiments.

Referring to FIG. 3, in an exemplary embodiment, a block diagram illustrates an exemplary implementation of a server 100 for communication with the sensors 14. The server 100 can be a digital computer that, in terms of hardware architecture, generally includes a processor 102, input/output (I/O) interfaces 104, a network interface 106, a data store 108, and memory 110. It should be appreciated by those of ordinary skill in the art that FIG. 3 depicts the server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 can be, for example but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the server 100, a semiconductor-based microprocessor (in the form of a microchip or chip set), or generally any device for executing software instructions. When the server 100 is in operation, the processor 102 is configured to execute software stored within the memory 110, to communicate data to and from the memory 110, and to generally control operations of the server 100 pursuant to the software instructions. The I/O interfaces 104 can be used to receive user input from and/or for providing system output to one or more devices or components. User input can be provided via, for example, a keyboard, touch pad, and/or a mouse. System output can be provided via a display device and a printer (not shown). I/O interfaces 104 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 106 can be used to enable the server 100 to communicate on a network, such as to communicate with other servers 14, 16 and/or with UEs. The network interface 106 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 106 can include address, control, and/or data connections to enable appropriate communications on the network. A data store 108 can be used to store data. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. In one example, the data store 108 can be located internal to the server 100 such as, for example, an internal hard drive connected to the local interface 112 in the server 100. Additionally in another embodiment, the data store 108 can be located external to the server 100 such as, for example, an external hard drive connected to the I/O interfaces 104 (e.g., SCSI or USB connection). In a further embodiment, the data store 108 can be connected to the server 100 through a network, such as, for example, a network attached file server.

The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 can incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

Figure 4:
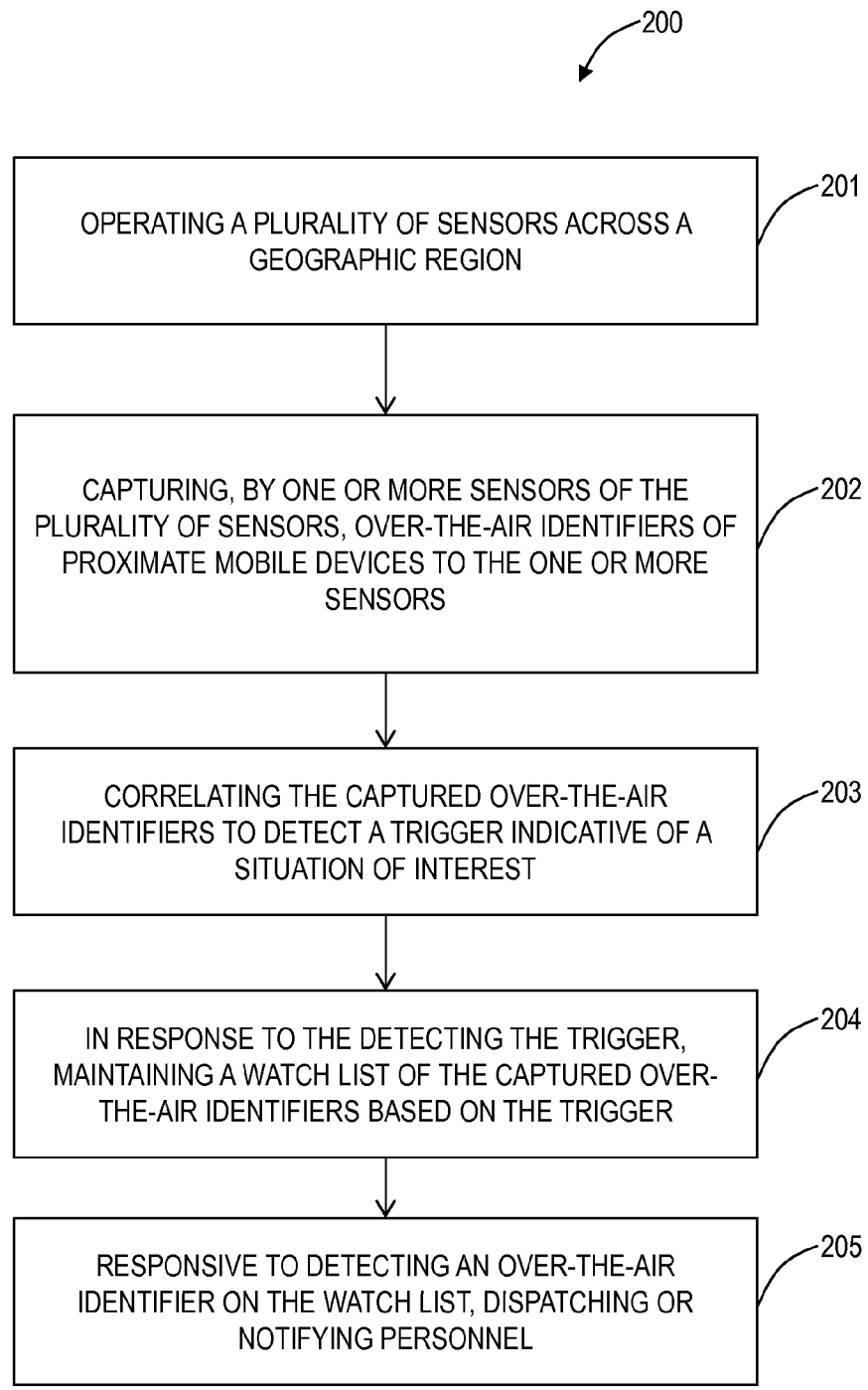
FIG. 4 is a flowchart of a tracking method in accordance with some embodiments.

In an exemplary embodiment, the server 100 can be the ICC 18. The server 100 can be communicatively coupled to the sensors 14 and configured to periodically receive data from the sensors 14 relates to OTAIs of interest. The server 100 can be configured to perform analytics and the like based of the continuously received data. For example, the server 100 can create a watch list of pertinent MAC IDs. The server 100 can correlate user identities with OTAIs based on a plurality of factors (e.g., images, police reports, etc.). Generally, the server 100 can operate as a command and control device for the analytic and tracking systems and methods described herein, Referring to FIG. 4, in an exemplary embodiment, a flowchart illustrates a tracking method 200 for use with the system 10. The tracking method 200 includes operating a plurality of sensors across a geographic region (step 201). For example, in FIG. 1, the geographic region can be a city, county, municipality, etc. The sensors 14 can be deployed in any location 22, 24, 26, 28, 30, 32, 34. The tracking method 200 further includes capturing, by one or more sensors of the plurality of sensors, over-the-air identifiers of proximate mobile devices to the one or more sensors (step 202).

The tracking method 200 further includes correlating the captured over-the-air identifiers to detect a trigger indicative of a situation of interest (step 203). As described herein the situation of interest can be, for example, related to public safety although other applications are also contemplated. The tracking method 200 further includes, in response to the detecting the trigger, maintaining a watch list of the captured over-the-air identifiers based on the trigger (step 204). The tracking method 200 can also include, responsive to detecting an over-the-air identifier on the watch list, dispatching or notifying personnel (step 205). For example, the personnel can be police, fire, medical, etc.

Figure 5:
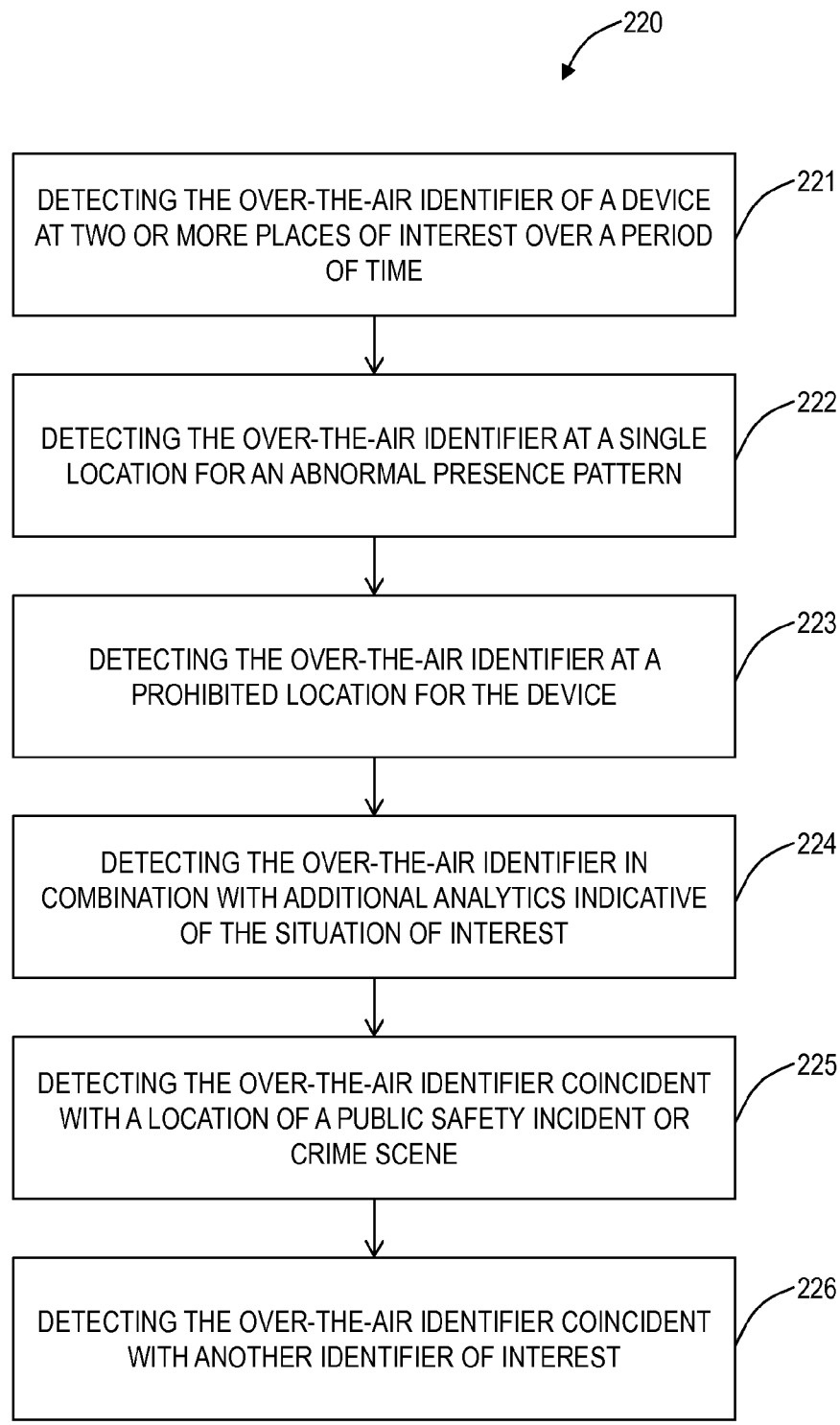
FIG. 5 is a flowchart of a trigger detection method for use with the tracking method of FIG. 4 and/or with the system of FIG. 1 in accordance with some embodiments.

Referring to FIG. 5, in an exemplary embodiment, a flowchart illustrates a trigger detection method 220 for use with the tracking method 200 and/or with the system 10. The trigger detection method 220 provides exemplary triggers for detecting the situation of interest based on public safety context although other applications are also contemplated. The trigger detection method 220 includes detecting the over-the-air identifier of a device at two or more places of interest over a period of time (step 221). The trigger detection method 220 further includes detecting the over-the-air identifier at a single location for an abnormal presence pattern (step 222). An abnormal presence pattern can be anything that relates to a potential threat. For example, an individual showing up at geographically distinct landmarks in a short period of time might be casing them for terrorist activity. Alternatively, an individual showing up at different banks in a short period of time may also be casing these banks.

The trigger detection method 220 further includes detecting the over-the-air identifier at a prohibited location for the device (step 223). The trigger detection method 220 further includes detecting the over-the-air identifier in combination with additional analytics indicative of the situation of interest (step 224). The trigger detection method 220 further includes detecting the over-the-air identifier coincident with a computer-assisted dispatch report (step 225). The trigger detection method 220 further includes detecting the over-the-air identifier coincident with another identifier of interest (step 226). Examples of identifiers of interest can anything that would make knowing or tracking the OTAI identifier useful.

Figure 6:
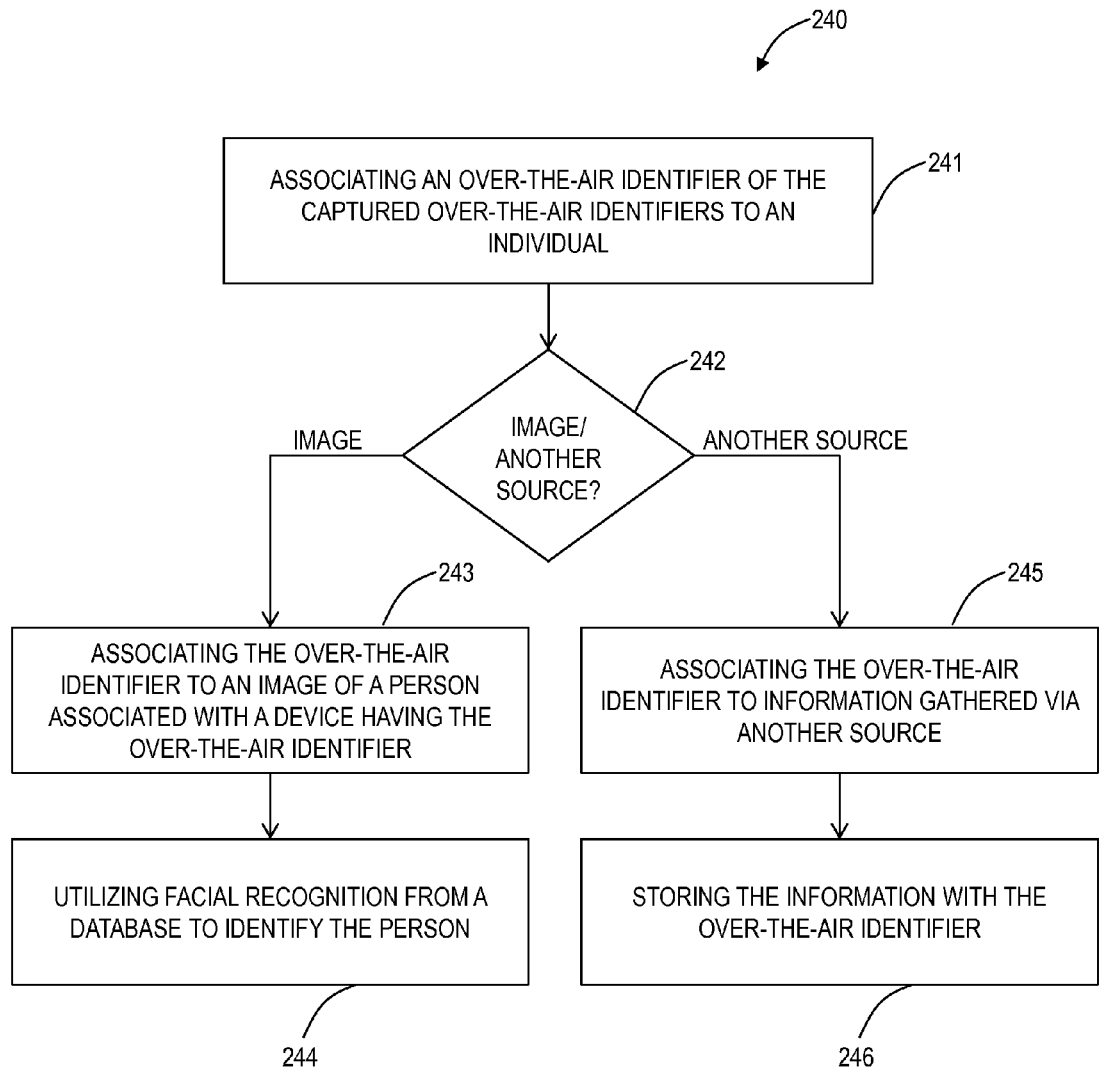
FIG. 6 is a flowchart of an association method for use with the tracking method of FIG. 4 and/or with the system of FIG. 1 in accordance with some embodiments.

Referring to FIG. 6, in an exemplary embodiment, a flowchart illustrates an association method 240 for use with the tracking method 200 and/or with the system 10. The association method 240 includes associating an over-the-air identifier of the captured over-the-air identifiers to an individual (step 241). Specifically, the association method 240 provides exemplary techniques to determine associations between the over-the-air identifier and its device's user, e.g. who has the MAC address of a certain device. Two exemplary techniques include image-based technique and another source-based techniques (step 242).

For an image, the association method 240 includes associating the over-the-air identifier to an image of a person associated with a device having the over-the-air identifier (step 243). The image can be taken coincident with the sensor 14 detecting the OTAI and can be taken by the sensor 14. The association method 240 further includes utilizing facial recognition from a database to identify the person (step 244).

For the another source, the association method 240 includes associating the over-the-air identifier to information gathered via another source (step 245). The association method 240 further includes storing the information with the over-the-air identifier (step 246). The another source can include, without limitation, a license plate number, an annotation by an individual such as a police officer, a voluntary or mandatory database of OTAIs, etc. For example, voluntary databases may include government employee devices, neighborhood watch groups, enterprise workers, children, etc. Involuntary databases may include parolees, registered sex offenders, persons with restraining orders, vehicles with outstanding tickets, etc.

Figure 7:
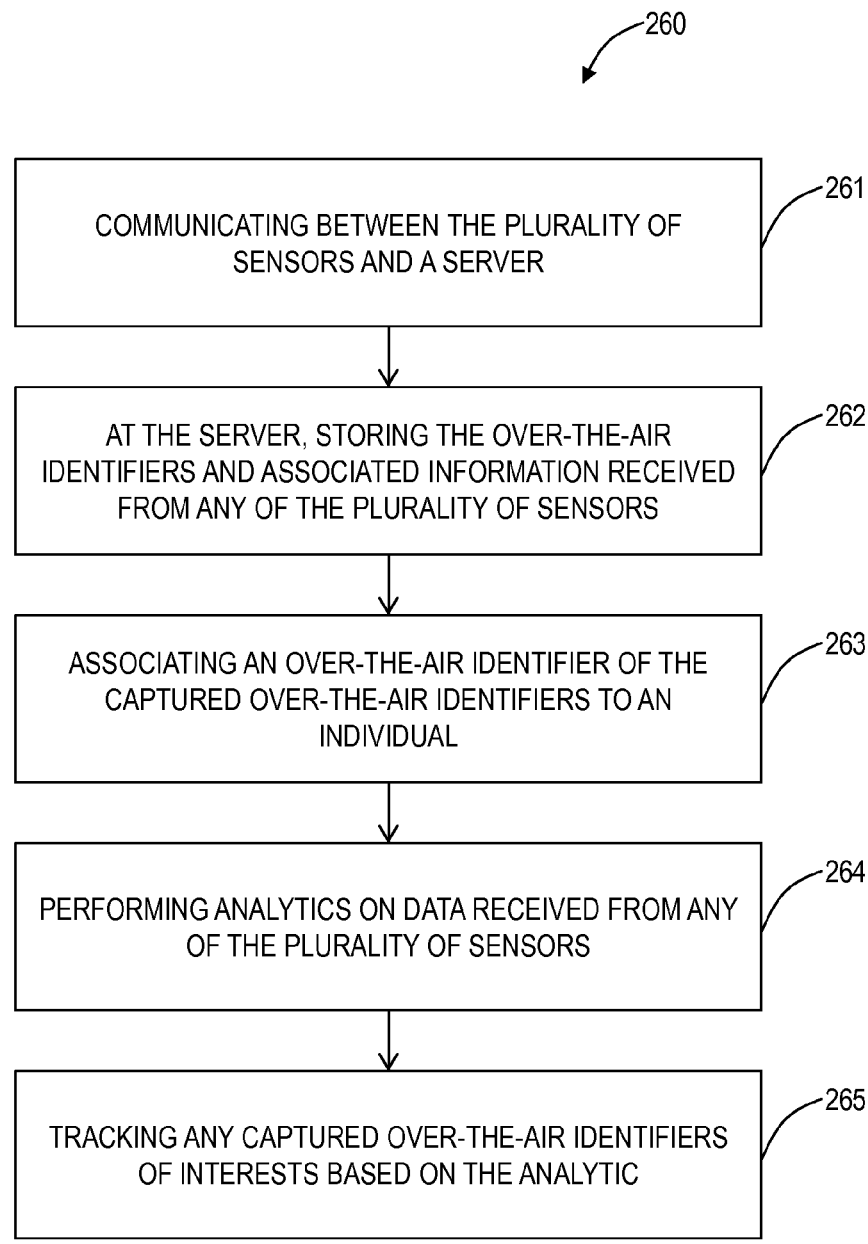
FIG. 7 is a flowchart of a server analytic method for use with the methods of FIGS. 4-6 and/or with the system FIG. 1 in accordance with some embodiments.

Referring to FIG. 7, in an exemplary embodiment, a flowchart illustrates a server analytic method 260 for use with the methods 200, 220, 240 and/or with the system 10. The server analytic method 260 includes communicating between the plurality of sensors and a server (step 261). The server analytic method 260 further includes, at the server, storing the over-the-air identifiers and associated information received from any of the plurality of sensors (step 262). The server analytic method 260 further includes associating an over-the-air identifier of the captured over-the-air identifiers to an individual (step 263). The server analytic method 260 includes performing analytics on data received from any of the plurality of sensors (step 264). The server analytic method 260 also includes tracking any captured over-the-air identifiers of interests based on the analytics (step 265).

Figure 8:
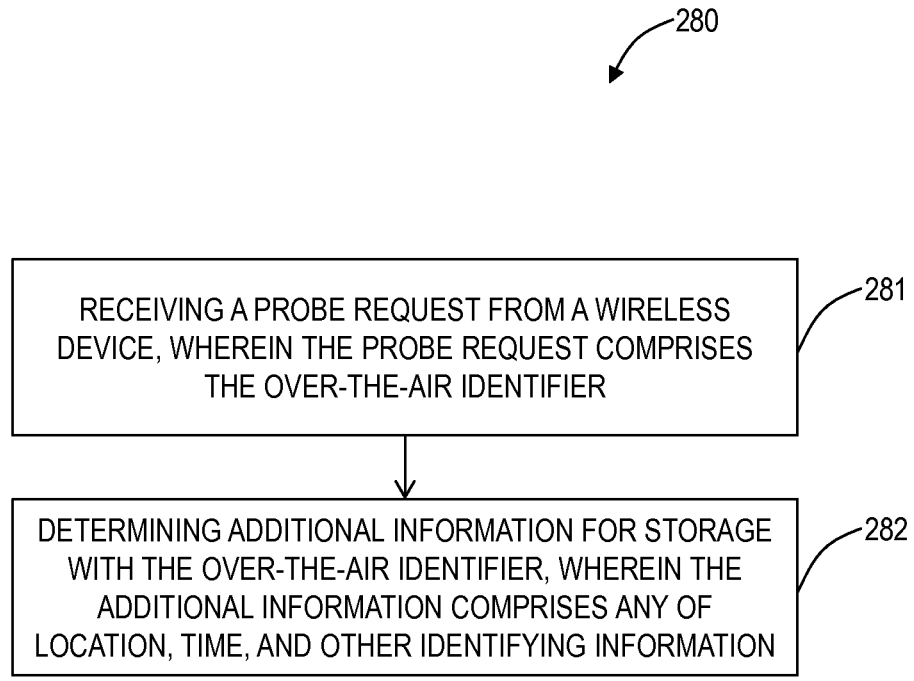
FIG. 8 is a flowchart of a probe request method for use with the tracking method of FIG. 4 and/or with the system of FIG. 1 in accordance with some embodiments.

Referring to FIG. 8, in an exemplary embodiment, a flowchart illustrates a probe request method 280 for use with the tracking method 200 and/or with the system 10. The probe request method 280 includes receiving a probe request from a wireless device, wherein the probe request comprises the over-the-air identifier (step 281). The probe request method 280 further includes determining additional information for storage with the over-the-air identifier, wherein the additional information comprises any of location, time, and other identifying information (step 282). The probe request can include a Wireless Local Area Network (WLAN) probe request compliant to IEEE 802.11. The other identifying information can include, without limitation, name, pictures, videos, addresses, license plate information, driver's license information, identity, etc.

Figure 9:
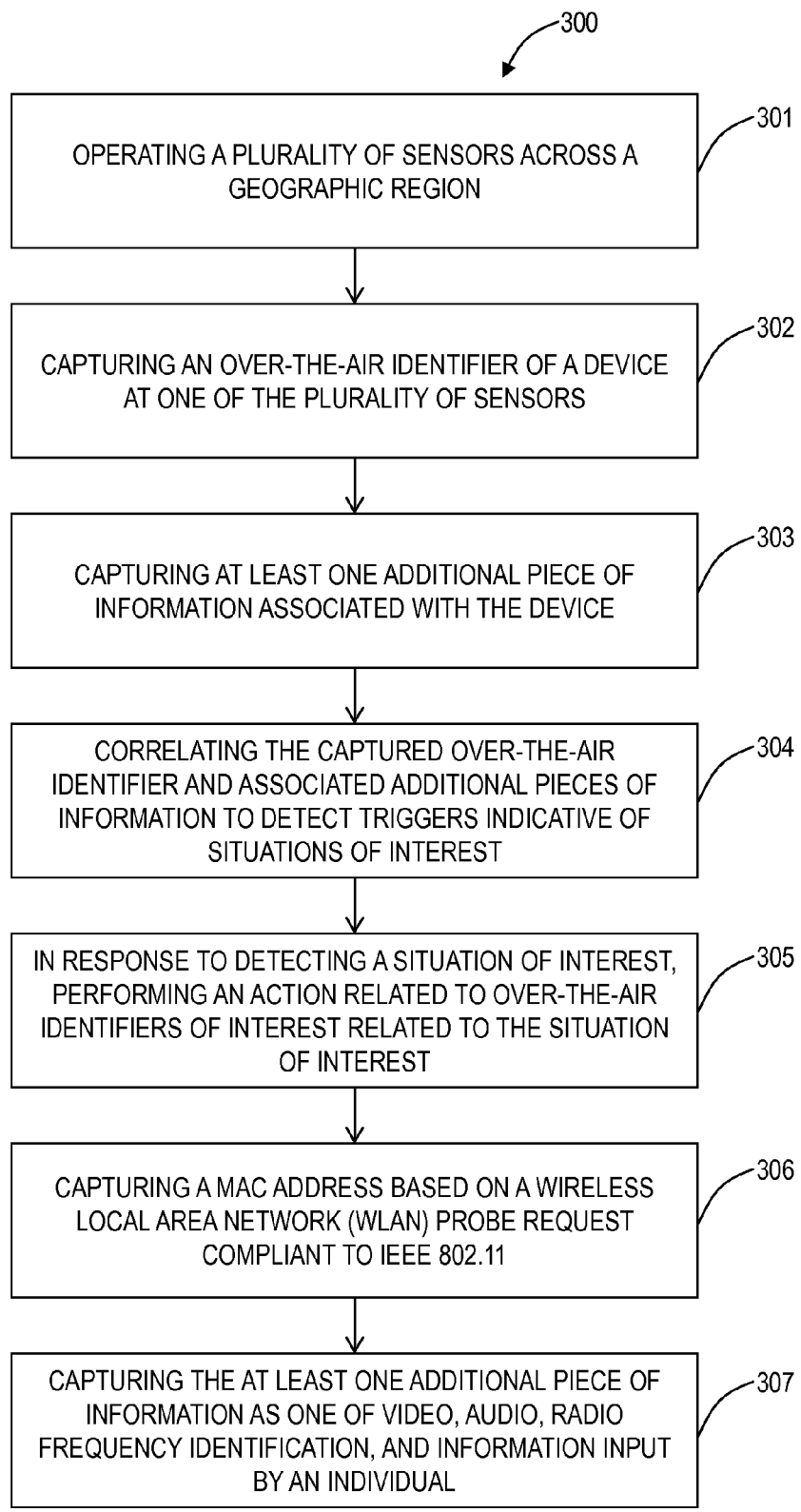
FIG. 9 is a flowchart of an identifying and tracking method in accordance with some embodiments.

Referring to FIG. 9, in an exemplary embodiment, a flowchart illustrates an identifying and tracking method 300 for use with the system 10. The identifying and tracking method 300 includes operating a plurality of sensors across a geographic region (step 301). The identifying and tracking method 300 further includes capturing an over-the-air identifier of a device at one of the plurality of sensors (step 302). The identifying and tracking method 300 further includes capturing at least one additional piece of information associated with the device (step 303). The identifying and tracking method 300 also includes correlating captured MAC addresses and associated additional pieces of information to detect triggers indicative of situations of interest (step 304).

The identifying and tracking method 300 further includes, in response to detecting a situation of interest, performing an action related to MAC addresses of interest related to the situation of interest (step 305). The identifying and tracking method 300 can include capturing the MAC address based on a Wireless Local Area Network (WLAN) probe request compliant to IEEE 802.11 (step 306). The identifying and tracking method 300 can also include capturing the at least one additional piece of information as one of video, audio, radio frequency identification, and information input by an individual (step 307).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An identifying and tracking method, comprising:
operating a plurality of sensors across a geographic region;
capturing an over-the-air identifier of a device at one of the plurality of sensors;
capturing additional incident information associated with the device;
correlating the captured over-the-air identifier and associated additional incident information to detect triggers indicative of situations of interest; and
in response to detecting a situation of interest, performing an action related to over-the-air identifiers of interest related to the situation of interest;
wherein capturing the over-the-air identifier of the device at one of the plurality of sensors comprises capturing a Media Access Control (MAC) address based on a Wireless Local Area Network (WLAN) probe request compliant to IEEE 802.11; and
wherein capturing the additional incident information associated with the device comprises capturing one of video, audio, radio frequency identification, and information input by an individual.

2. An analytic and tracking system, comprising:
a plurality of sensors deployed across a geographic region;
at least one server, wherein the at least one server and the plurality of sensors are communicatively coupled therebetween; and
a database coupled to the at least one server;
wherein the plurality of sensors are configured to capture over-the-air identifiers of proximate devices and associated information;
wherein the at least one server and the plurality of sensors are configured to correlate the captured over-the-air identifiers and the associated information for detecting a trigger indicative of a situation of interest and performing an action based thereon; and
wherein the trigger comprises one of:
detecting the over-the-air identifiers of a device at two or more places of interest over a period of time;
detecting the over-the-air identifiers at a single location for an abnormal presence pattern;
detecting the over-the-air identifiers at a prohibited location for the device;
detecting the over-the-air identifiers in combination with additional analytics indicative of the situation of interest;
detecting the over-the-air identifiers coincident with a computer-assisted dispatch report; and
detecting the over-the-air identifiers coincident with another identifier of interest.

3. The analytic and tracking system of claim 2, wherein the over-the-air identifiers comprise a Media Access Control (MAC) address, and wherein the plurality of sensors are further configured to:
capture the MAC address based on a Wireless Local Area Network (WLAN) probe request compliant to IEEE 802.11;
capture the associated information as one of video, audio, radio frequency identification, and information input by an individual.

4. The analytic and tracking system of claim 2, wherein the plurality of sensors are each one of stationary and mobile, wherein the mobile sensors are deployed on government vehicles and on government personnel, and wherein the fixed sensors are deployed in government buildings and on machine-to-machine devices.

5. An analytic and tracking system, comprising:
a plurality of sensors deployed across a geographic region;
at least one server, wherein the at least one server and the plurality of sensors are communicatively coupled therebetween; and
a database coupled to the at least one server;

wherein the plurality of sensors are configured to capture over-the-air identifiers of proximate devices and associated information;

wherein the at least one server and the plurality of sensors are configured to correlate the captured over-the-air identifiers and the associated information for detecting a trigger indicative of a situation of interest and performing an action based thereon; and wherein the at least one server and the plurality of sensors are further configured to:
- associate the over-the-air identifiers of a device to an individual through one of (i) capturing an image and performing facial recognition and (ii) associating the individual through information gathered via another source.

6. The analytic and tracking system of claim 5, wherein the over-the-air identifiers comprise a Media Access Control (MAC) address, and wherein the plurality of sensors are further configured to:
- capture the MAC address based on a Wireless Local Area Network (WLAN) probe request compliant to IEEE 802.11;
- capture the associated information as one of video, audio, radio frequency identification, and information input by an individual.

7. The analytic and tracking system of claim 5, wherein the plurality of sensors are each one of stationary and mobile, wherein the mobile sensors are deployed on government vehicles and on government personnel, and wherein the fixed sensors are deployed in government buildings and on machine-to-machine devices.

* * * * *

UNITED STATES PATENT AND TRADEMARK OFFICE
CERTIFICATE OF CORRECTION

PATENT NO. : 9,084,103 B2
APPLICATION NO. : 14/158045
DATED : July 14, 2015
INVENTOR(S) : Deborah J. Monks et al.

It is certified that error appears in the above-identified patent and that said Letters Patent is hereby corrected as shown below:

ON THE TITLE PAGE:

In Item (71), under "Applicant", in Column 1, Line 1, delete "INC," and insert -- INC., --, therefor.

In Item (72), under "Inventors", in Column 1, Line 1, delete "Deborah J Monks," and insert -- Deborah J. Monks, --, therefor.

In Item (72), under "Inventors", in Column 1, Line 2, delete "Tyrone D Bekiares," and insert -- Tyrone D. Bekiares, --, therefor.

In Item (72), under "Inventors", in Column 1, Line 3, delete "Timothy J Collins," and insert -- Timothy J. Collins, --, therefor.

In Item (72), under "Inventors", in Column 1, Line 4, delete "Trent J Miller," and insert -- Trent J. Miller, --, therefor.

On Page 2, in Item (56), under "OTHER PUBLICATIONS", in Column 2, Line 25, delete "Trent J Miller," and insert -- Trent J. Miller, --, therefor.

On Page 2, in Item (56), under "OTHER PUBLICATIONS", in Column 2, Line 27, delete "Trent J Miller," and insert -- Trent J. Miller, --, therefor.

IN THE SPECIFICATION:

In Column 1, Line 8, delete "2012," and insert -- 2012, now Pat. No. 8,892,132, --, therefor.

In Column 2, Line 16, delete "is block" and insert -- is a block --, therefor.

In Column 4, Line 49, delete "Rel-12" and insert -- Rel-12. --, therefor.

Signed and Sealed this
Twenty-sixth Day of April, 2016

Michelle K. Lee
*Director of the United States Patent and Trademark Office*

CERTIFICATE OF CORRECTION (continued)
U.S. Pat. No. 9,084,103 B2

In Column 6, Lines 60-61, delete "a OTAI" and insert -- an OTAI --, therefor.

In Column 7, Line 46, delete "(IO)" and insert -- (I/O) --, therefor.

In Column 8, Line 39, delete "14 60" and insert -- 14 --, therefor.

In Column 9, Line 45, delete "servers" and insert -- sensors --, therefor.

In Column 10, Line 14, delete "(O/S)" and insert -- (OS) --, therefor.

In Column 10, Line 33, delete "herein," and insert -- herein. --, therefor.